UNITED STATES PATENT OFFICE.

THOMAS R. DU BOIS, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STARTING AND GENERATING SYSTEM.

1,363,236.

Specification of Letters Patent.   Patented Dec. 28, 1920.

Application filed May 18, 1916.   Serial No. 98,341.

*To all whom it may concern:*

Be it known that I, THOMAS R. DU BOIS, a citizen of the United States, residing at Niagara Falls, in the county of Niagara and State of New York, have invented new and useful Improvements in Starting and Generating Systems, of which the following is a specification.

This invention relates to starting and generating systems.

In starting and generating systems for automobiles, considerable difficulty has been experienced, due to the fact that the generator will not always pick up readily. This is due partly to a fact that the generator operates at a low voltage, whereby in picking up, only a low voltage is developed across the field windings, and in some cases is due to the high contact resistance between the commutator and the brushes. To overcome this difficulty, a system has been used in which the field winding has been connected for energization from the storage battery. In such a system no automatic switch is used between the generator and the storage battery, and at speeds below the proper cutting in speed of the generator, the generator acts as a motor. In order to stop the engine, it is necessary to throw open the starting switch.

In certain systems, as for instance the well known two-unit systems for starting and generating, it is not possible to keep the engine turning by means of the generator. Either an automatic switch is necessary or it is necessary to depend upon the driver to open the switch when the engine stops or slows down to such a degree that the generator is not developing a voltage equal to the back voltage of the storage battery.

One of the objects of the present invention is to provide a system of the class referred to in which the generator will readily pick up.

A further object is to provide a system, simple in construction and reliable in operation.

A further object is to provide a system for starting and generating in which the initial field excitation of the generator will be supplied from the storage battery and in which there will be no waste of battery current when the generator is at rest.

A further object is to provide a system which will not only insure the ready picking up of the generator but will prevent any waste of battery current when the engine is stopped or is operating at a low speed.

Further objects will be apparent as the description proceeds.

Referring to the drawings.

Figure 1:
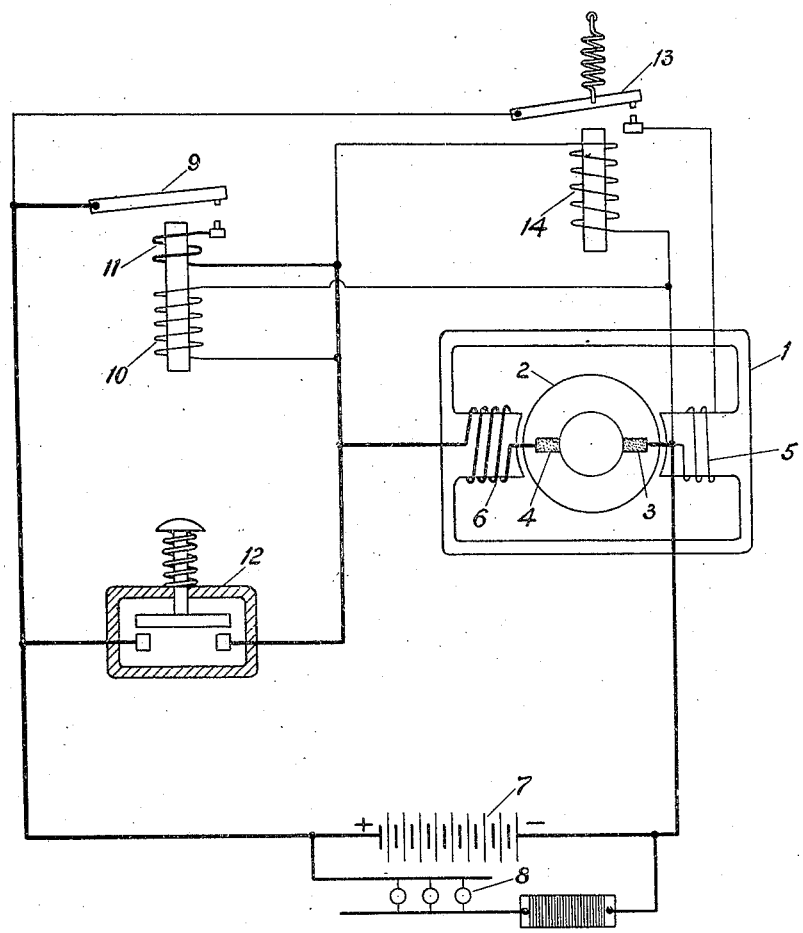
Figure 1 represents an embodiment of the present invention applied to a single unit starting and generating system.

Referring now to Fig. 1, the numeral 1 represents the field frame of the dynamo-electric machine which is adapted to act as a motor for the purpose of starting an internal combustion engine and also to act as a generator for the purpose of charging a storage battery and lighting lamps. Associated with said field frame is an armature 2 having brushes 3 and 4. Said field frame is provided with a shunt winding 5 and a series winding 6. The brushes 3 and 4 are adapted to supply the storage battery 7 through suitable conductors. The lamp circuit 8 is bridged across the terminals of the storage battery 7.

Connected in parallel circuits between the series winding 6 and the storage battery are the automatic switch 9 and the starting switch 12. Said automatic switch 9 is provided with the usual shunt coil 10 and the usual holding coil 11, connected to control the circuit between the dynamo-electric machine and the battery in a manner well understood. Connected in circuit with the shunt winding 5 is the shunt field switch 13 which, as shown in the drawing connects the shunt winding 5 across the battery 7. Said shunt field switch 13, is controlled by the shunt coil 14 which is connected to measure the voltage across the terminals of the armature 2. Shunt coil 14 is wound for a voltage considerably less than the normal voltage of the dynamo-electric machine. For instance, with the dynamo-electric machine shown, which is designed to normally develop 12 volts, the coil 14 would be wound to attract and close switch 13 at approximately 4 volts.

A mode of operation of the system disclosed in Fig. 1 is substantially as follows: When it is desired to start the car, the operator will close the starting switch 12. Current may now pass from the positive side of the battery, through the starting switch 12, series winding 6, armature 2, back to the negative side of the battery. Part of the current from the battery will be diverted from the series winding 6 and the armature 2 and will pass through the shunt coil 14. Assuming that the system disclosed is a twelve volt system, the voltage at the terminals of the dynamo-electric machine will be approximately 10 volts. Inasmuch as the switch 13 is adjusted for 4 volts, said switch will close immediately. The dynamo-electric machine will crank the engine, starting the same. When the engine has been started, the operator will release the starting switch 12, but even though the speed of the engine has not increased to a value sufficient for driving the dynamo-electric machine at the speed necessary to charge the battery, nevertheless, sufficient voltage will be developed to hold closed the shunt field switch 13. When the dynamo-electric machine is developing a voltage sufficient to charge the storage battery, the automatic switch 9 will close in the usual manner and the dynamo-electric machine will supply current for the purpose of charging the storage battery 7 and supplying the lights 8. Furthermore, the voltage developed at the terminals of the dynamo-electric machine will be more than sufficient to hold closed the shunt field switch 13. The shunt field switch 13 will accordingly remain closed until the engine has been stopped or has been slowed down, so that it will develop less than the 4 volts sufficient to hold said switch closed. When the armature 2 is at rest or is rotating very slowly, the switch 13 will be open and therefore no discharge from the battery through the shunt field circuit can take place.

Figure 2:
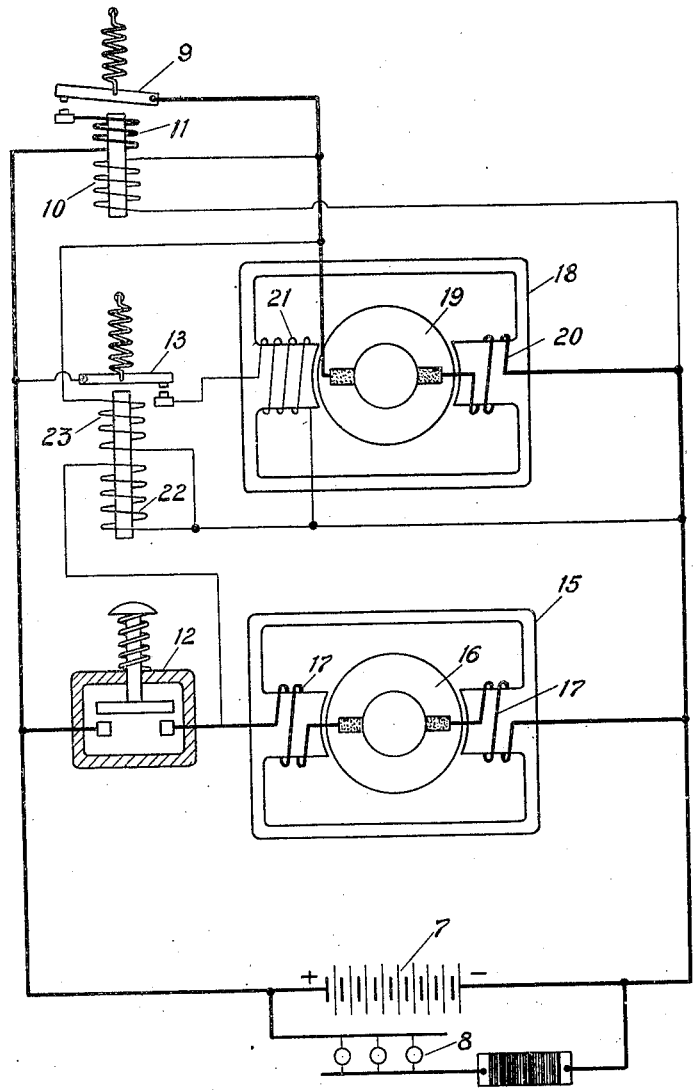
Fig. 2 represents a modification applied to a double unit starting and generating system.

Referring now to Fig. 2, a modification of the present invention is disclosed as applied to a double unit starting and generating system. In this system, as in Fig. 1, the storage battery 7 is adapted to supply the lamp circuit 8. The single dynamo electric machine is replaced by two dynamo-electric machines, the one indicated by the numeral 15 being adapted to operate as a motor and the other indicated by the numeral 18, being adapted to operate as a generator. The two dynamo-electric machines 15 and 18 may be mechanically connected in any suitable manner. Said dynamo-electric machine 15 is provided with an armature 16 and series coils 17. Said dynamo-electric machine 18 is provided with an armature 19, series coil 20 and a shunt coil 21. A starting switch 12 and automatic switch 9 are provided, as in the system disclosed in Fig. 1. A shunt field switch 13 is also provided. Instead of having only one operating coil, it is provided with two coils of approximately equal strength. Assuming as before that the system is a 12-volt system, each of the coils 22 and 23 will be wound to produce a sufficient pulling effect at 4 volts to close the switch 13.

A mode of operation of the system disclosed in Fig. 2 is substantially as follows. When it is desired to start the dynamo-electric machine, the operator will close the starting switch 12, thus connecting the dynamo-electric machine 15 directly across the storage battery 7. Closing of the starting switch 12 will also connect the coil 22 across the terminals of the storage battery 7. The coil 22 will exert an effect more than sufficient to close the switch 13, which, being in circuit with the shunt winding 21 of the dynamo-electric machine 18, will immediately close the exciting circuit for dynamo-electric machine 18 upon storage battery 7. The dynamo-electric machine 15, acting as a motor, will turn the armature 19, which will develop an E. M. F. across the terminals of the dynamo-electric machine 18. After the engine has been started, the operator will release the starting switch 12, but the engine will be driving the armature 19 at sufficient speed to develop a voltage necessary for coil 23 to hold closed the switch 13. When the voltage at the terminals of the dynamo-electric machine 18 rises to a sufficient value, the automatic switch 9 will close and charging current will be delivered to the storage battery 7, the shunt field switch 13 being held closed meanwhile by the coil 23. When the armature 19 is stopped or is rotating at a very low speed, the effect of coil 23 will be insufficient to hold closed the switch 13 and the same will be opened. It is apparent, therefore that in this system as well as in the system disclosed in Fig. 1, waste of current from the storage battery will be prevented. It will be seen, moreover, that the action of the shunt field switch 13 is automatic and requires no action on the part of the operator.

Two embodiments of the present invention have been described in detail. Various modifications will occur to those skilled in the art. It is desired to cover in this case all such modifications as fall within the scope of the invention as defined by the appended claims.

Having described my invention, what I claim as new and desire to secure by Letters Patent of the United States is:

1. In a starting and generating system, a storage battery, dynamo electric machinery adapted to have both motoring and generating functions, said machinery having a field winding, means responsive to a predetermined minimum voltage across said system for completing a circuit for said field winding and a switch for connecting said battery to said machinery for motoring functions, said minimum voltage responsive means being responsive to said switch.

2. In a starting and generating system, dynamo electric machinery adapted to have both motoring and generating functions, said machinery being provided with a field winding, a source of E. M. F., a starting switch for connecting said source to impose its E. M. F. across said system, and means responsive to said switch and also responsive to a predetermined voltage across said system for completing the circuit of said field winding.

3. In a starting and generating system, a dynamo-electric machine adapted to operate as a generator and provided with a field winding, a storage battery, a starting switch for connecting said battery to the generator during starting, and means actuated upon actuation of said starting switch to cause energization of said field winding, said means responding continuously thereafter to a minimum voltage at the terminals of said machine to maintain said field winding circuit energized.

4. In a starting and generating system, dynamo electric machinery having both motoring and generating functions, said machinery having a winding, a storage battery, a starting switch adapted to connect said battery to said machinery for starting, a normally open circuit for said field winding, means responsive to a minimum voltage produced by said dynamo-electric machine in generating for maintaining said field circuit closed, said means also operating to close said circuit in response to the voltage impressed across the system upon closing the starting switch, said means being also unaffected by said switch in opening.

5. In a starting and generating system, dynamo electric machinery provided with a field circuit, a storage battery, a starting switch for connecting said battery to said machinery for motoring functions, said circuit being normally inoperative to produce flux when said machinery is idle, and means responsive to the voltage impressed across said machinery in motoring for rendering said circuit operative.

6. In a starting and generating system, a dynamo-electric machine adapted to operate as a generator provided with a field circuit, a storage battery and a starting switch to connect said battery to the system for starting, said circuit being normally inoperative to produce flux when said machine is idle, and means responsive to said starting switch for rendering said circuit operative and thereafter responsive to the voltage of said machine for maintaining said circuit operative.

7. In combination, a storage battery, a dynamo-electric machine adapted to operate as a generator to supply an external circuit and provided with a field winding, means independent of the current supplied by said machine to said external circuit but responsive to a minimum terminal voltage of said machine to maintain said field winding operative to produce flux, and means to cause said last mentioned means to connect said field winding to said battery.

8. In combination, starting and generating dynamo-electric machinery adapted to supply current to an external circuit and provided with a field circuit, a storage battery, a switch located in said circuit, operating means for said switch responsive to the voltage developed by said machinery while operating as a generator, but independent of the current supplied thereby to the external circuit, and means whereby said switch may be operated from said battery in the starting operation of said dynamo-electric machinery.

9. In a starting and generating system, a pair of armatures, one of which is adapted to drive the other, one of which is adapted to operate as a generating armature, said generating armature being provided with a field circuit, a starting switch, controlling means for said circuit, an operating winding for said controlling means adapted to be energized by said starting switch, and a second operating winding for said controlling means responsive to the voltage developed by said generating armature.

10. In an electrical system, in combination, a storage battery, dynamo-electric machinery for charging said battery and for performing motoring functions, a switch for connecting said battery to said machinery to energize same for motoring functions and means responsive both to said switch and to the voltage across said machinery for connecting said machinery to said battery to receive field excitation therefrom for its generating functions.

11. In a starting and generating system for automotive vehicles, dynamo-electric machinery adapted to have both motoring and generating functions, said machinery having a plurality of field windings, one of which is operative only when said machinery is performing generating functions, a storage battery, and means responsive to the starting of the motoring function and also responsive to the voltage across said machinery, for connecting said one winding for energization from said battery.

12. In a starting and generating system, dynamo-electric machinery having an armature winding for use in motoring and an additional armature winding for use in generating, a storage battery, a generator field winding adapted for connection across the generator armature, a starting switch for connecting said battery to the system for starting, and means under the control of said starting switch for causing energization of said generator field winding from said battery.

13. In combination, a storage battery, dynamo-electric machinery having an armature and a shunt field winding adapted to be connected across said armature, a switch for closing circuit between said battery and said machinery for motoring functions, and means for connecting said shunt field winding across said armature either in response to the voltage across said armature or to the closure of said switch.

14. In combination, a storage battery, dynamo-electric machinery adapted to have both motoring and generating functions, said machinery having a shunt field winding, a switch for connecting said machinery to said battery, and a second switch responsive in closing to the closure of said first switch for connecting said shunt field winding for energization from said battery during generating functions, said second switch being unaffected by the opening of said first switch.

15. In a starting and generating system, dynamo-electric machinery having motor armature windings, generator armature windings, a generator field winding normally open-circuited, a storage battery, a starting switch for connecting said battery to the motor armature for starting, and means responsive to the operation of said switch to close the generator field circuit, said means also being responsive to the generator voltage to maintain said field winding circuit closed.

16. A starting and generating system including motor armature windings for starting, generator armature windings for generating, a storage battery to be charged thereby, means to disconnect the battery from the generator when the generator voltage falls below the battery voltage, a field winding for said generator armature windings normally open-circuited to prevent discharge of battery current therethrough, and means responsive to the initiation of motoring functions and controlled by the voltage across said generator armature windings to hold said field circuit closed until the generator voltage drops to a negligible value regardless of the position of said battery disconnecting means.

17. In combination, dynamo-electric machinery having motoring and generating functions, said machinery having an armature and a shunt field winding adapted to receive energization from said armature, a starting switch, a storage battery, and means responsive to said starting switch for connecting said battery to aid in the energization of said shunt field winding, said means being also responsive to the voltage across said armature.

18. A starting and generating system including motor armature windings for starting, generator armature windings for generating, a storage battery to be charged thereby, means to disconnect the battery from the generator when the generator voltage falls below the battery voltage, a field winding for the generator normally open-circuited to prevent discharge of battery current therefrom, and means controlled by the generator voltage to hold said field circuit closed until the generator voltage drops to a negligible value regardless of the position of said battery disconnecting means, said means also acting to close said field circuit whenever said motor armature is connected to the battery for starting.

In witness whereof, I have hereunto subscribed my name.

THOMAS R. DU BOIS.